United States Patent Office 2,940,930
Patented June 14, 1960

2,940,930
LUBRICATING GREASE COMPOSITIONS

Warren C. Pattenden, Courtright, Ontario, and Francesco G. Bonmartini and Lorne W. Sproule, Sarnia, Ontario, Canada, assignors to Esso Research and Engineering Company, a corporation of Delaware No Drawing. Filed May 15, 1956, Ser. No. 584,889

7 Claims. (Cl. 252—39)

This invention relates to lubricating grease compositions. More particularly, the invention pertains to grease compositions containing the metal salts of reaction products obtained by reacting together dicarboxylic acids, monocarboxylic acids and alcohols.

Broadly, the invention comprises the preparation of grease-thickening agents from the reaction products obtained from the reaction of dicarboxylic acids, high molecular weight monocarboxylic acids and polyhydric alcohols, and to lubricating grease compositions containing the same. In the prior art, metal salts of dicarboxylic acids have only found limited use in the preparation of lubricating grease compositions, since these metal salts are not dispersible in oil.

In accordance with the present invention, it has now been found that lubricating grease compositions having high melting points and other desirable grease characteristics can be prepared from thickening agents containing dicarboxylic acid radicals. More specifically, it has been found that the metal salts of the reaction products of dicarboxylic acid, high molecular weight monocarboxylic acids and polyhydric alcohols have excellent oil dispersibility and will impart the high dropping points and other grease properties characteristic of the lubricating compositions of the invention.

The preferred dicarboxylic acid reactants utilized in forming the compositions of the invention are those dicarboxylic acids corresponding to the following formula:

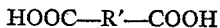

HOOC—R'—COOH wherein R' is an aliphatic or cycloaliphatic hydrocarbon radical containing from about 1 to 8 carbon atoms. Examples of such acids include malonic, succinic, glutaric, adipic, pimelic, suberic, azelaic, sebacic and isosebacic acids. Hydroxy dicarboxylic acids such as maleic, tartaric acids, etc. and aromatic dicarboxylic acids such as phthalic, isophthalic, and terephthalic acids may also be employed. The aliphatic dicarboxylics or mixture of aliphatic dicarboxylic acids are, however, preferred.

The high molecular weight monocarboxylic acids used may be any of the commonly known soap-forming fatty acids. Examples of these acids include saturated or unsaturated aliphatic monocarboxylic acids having from about 12 to 30, preferably about 18 to 22 carbon atoms, per molecule such as lauric, myristic, palmitic, stearic, 12-hydroxy stearic, 9,10-dihydroxy stearic, behenic, myristoleic, palmitoleic, oleic, linoleic, cottonseed oil fatty acids, palm oil fatty acids, hydrogenated fish oil fatty acids, lignoceric, erucic acids and their mixtures and/or their glycerides such as lard, beef, rapeseed, palm, menhaden, herring, castor oils, etc.

The polyhydric alcohol or glycol reactant contemplated in this invention has the following general formula:

HO—R—OH wherein R is an aliphatic hydrocarbon radical having from about 1 to 12, preferably 2 to 6, carbon atoms per molecule. Illustrative examples of these polyhydric alcohols include ethylene glycol, propanediol-1,2, propanediol-1,3, butanediol-1,3, butanediol-1,4, pentanediol-1,5, pentanediol-1,4, pentanediol-1,3, hexanediol-1,6, and the like. Altough the general formula given above shows a glycol wherein the hydroxyl groups are attached to the terminal carbon atoms, there is no limitation as to which carbon atoms carry the hydroxy groups. Glycols containing oxygen or sulfur atoms may also be employed, such as polyethylene and polypropylene glycols (e.g., di-, tri-, and tetra-ethylene glycol and di-, tri-, and tetra-propylene glycol).

The exact nature of the acidic reaction products of the dicarboxylic acid, the high molecular weight monocarboxylic acid and the glycol is not known. In general, the desired reaction products can be obtained by directly reacting together the dicarboxylic acid, the high molecular weight monocarboxylic acid and the glycol. Ordinarily, about 1 to 3 mols, preferably about 1 mol, of the dicarboxylic acid; about 1 to 3 mols, preferably about 1 mol of the high molecular weight monocarboxylic acid; and about 1 to 3 mols, preferably about 1 mol, of glycol are utilized. The mixture is heated to temperature within the range of about 275° to 400° F., preferably about 300° to 350° F., for about 1 to 5 hours.

As an alternative method of preparation, the reaction of the foregoing materials may be carried out in the presence of a liquid dispersant. This liquid dispersant may, for example, constitute the material to which the reaction products of the dicarboxylic acid, the fatty acid and the glycol or the metal salt of the reaction product is to be employed with in preparing compositions encompassed by the invention. Thus, lubricating grease compositions may be prepared by dispersing the reactants in a lubricating oil menstruum, heating the resulting mixture to obtain the desired reaction product, saponifying the reaction product to obtain said metal salt grease-thickening agent, and then cooling to obtain the lubricating grease composition.

The lubricating oil useful in preparing the lubricating grease compositions of the invention or as the liquid dispersant during the preparation of the reaction products of the dicarboxylic acids, the high molecular weight monocarboxylic acids and the glycols may be any of the conventionally used mineral, synthetic, animal or vegetable lubricating oil base stocks. In general, these lubricating oils should have a viscosity of about 50 to 2,000 SUS at 100° F. and about 35 to 200 SUS at 210° F., an A.S.T.M. pour point of about +20 to −75° F., a flash point of about 350° to 650° F., and a viscosity index of about 0 to 60. Conventionally refined and treated mineral lubricating oil base stocks derived from paraffinic, naphthenic and mixed base crudes having the properties listed above are especially useful in preparing the grease compositions of this invention.

The synthetic lubricating oils which may also be employed include esters of monobasic acid (e.g., an ester of $C_8$ Oxo alcohol with $C_8$ Oxo acid, an ester of $C_{13}$ Oxo alcohol with octanoic acid, etc.), esters of dibasic acids (e.g., di-2-ethyl hexyl sebacate, di-nonyl adipate, etc.), esters of glycols (e.g., $C_{13}$ Oxo acid diester of tetraethylene glycol, etc.), complex esters (e.g., the complex ester formed by reacting one mol of tetraethylene glycol with two moles of sebacic acid and two moles of 2-ethylhexanol, a complex ester formed by reacting one mol of tetraethylene glycol, one mol of $C_8$ Oxo alcohol and one mol of $C_8$ Oxo acid, etc.), esters of phosphoric acid (e.g., the ester formed by contacting three moles of the mono-methyl ether of ethylene glycol with one mol of phosphorous oxychloride, etc.), halocarbon oils (e.g., the polymer of chlorotrifluoroethylene containing twelve recurring units of chlorotrifluoroethylene), alkyl silicates (e.g., methyl polysiloxanes, ethyl polysiloxanes, methylphenyl polysiloxanes, etc.), sulfite esters (e.g., ester formed by reacting one mol of sulfur oxychloride with two moles of the methyl ether of ethylene glycol, etc.) carbonates (e.g., the carbonate formed by reacting $C_8$ Oxo alcohol with ethyl carbonate to form a half ester and reacting this half ester with tetraethylene glycol), mercaptals (e.g., the mercaptal formed by reacting 2-ethyl hexyl mercaptan with formaldehyde), formals (e.g., the formal formed by reacting $C_{13}$ Oxo alcohol with formaldehyde), polyglycol type synthetic oils (e.g., the compounds formed by condensing butyl alcohol with fourteen units of propylene oxide, etc.), or mixtures of the above in any proportions.

The metals useful in neutralizing or saponifying the acidic reaction products of the invention may be any alkali or alkaline earth metals such as sodium, lithium, calcium, magnesium, strontium, barium, etc. These metals can be employed in the form of their hydroxides, oxides, carbonates, etc., the preferred metal bases being lithium and calcium bases. Only a neutralizing or saponifying proportion of the metal base need be employed in preparing the metal salts of the invention. In accordance with the preferred grease manufacturing process of the invention, the amount of metal base employed may be as much as 40% in excess of that required for neutralization. In a number of instances it has been found that superior greases may be obtained by utilizing 20% excess metal base.

As previously stated, the lubricating grease compositions of the invention may be prepared by forming the acidic reaction product of the dicarboxylic acid, the high molecular weight fatty acid and the glycol in the presence of a lubricating oil dispersant. This method comprises generally dispersing the acid and the glycol in the lubricating oil at a temperature within the range of about 200° to 320° F., cooling the resulting mixture to a temperature of about 150° to 230° F., adding the saponifying agent (i.e., the metal base), and then raising the temperature to about 250° to 400° F., preferably about 300° to 400° F., maintaining the temperature until saponification is substantially completed, and then cooling to ambient or room temperature to obtain the lubricating grease composition.

The lubricating grease compositions may also be prepared by first forming the acidic reaction products and then incorporating them into the lubricating oil base stock. The acidic reaction product is prepared as described above, and is then dissolved in the lubricating oil by heating to a temperature within the range of about 150° to 200° F. The saponifying agent is added, and the mixture heated to a temperature of about 250° to 400° F. to effect substantially complete saponification and dehydration. The dehydrated mixture, containing the metal salt of the reaction product, is then cooled to ambient or room temperature to obtain the final grease composition.

Generally, about 5 to 20 wt. percent of the acidic reaction products of the dicarboxylic acid, the high molecular weight monocarboxylic acid and the glycol will be employed in preparing the inventive grease composition. These grease compositions will have the following formulation:

|  | General Range, wt. Percent | Preferred Range, wt. Percent |
|---|---|---|
| Dicarboxylic acid | 1 to 6 | 1 to 3 |
| Monocarboxylic acid | 3 to 12 | 3 to 8 |
| Glycol | 0.5 to 5 | 1 to 3 |
| Metal base | 1 to 3 | 1 to 2 |
| Lubricating oil | 94.5 to 74 | 94 to 84 |

All of the above weight percentages are based on the total weight of the lubricating grease composition.

Minor amounts, in the order of about 0.01 to 10% by weight of conventional lubricating grease additives may also be incorporated in the grease compositions of this invention. Examples of such additives include conventional thickening agents, oxidation inhibitors, corrosion and rust inhibitors, extreme pressure agents, metal deactivators and the like.

The following examples are presented to illustrate the preparation and various characteristics of suitable greases manufactured according to this invention.

EXAMPLE I

Several lubricating greases were prepared from the following constituents:

*Formulation*

|  | Weight Percent | |
|---|---|---|
|  | Grease A | Grease B |
| Acidic reaction product | [1] 13.6 | [2] 16.4 |
| Lithium hydroxide monohydrate | 2.4 | [3] 1.8 |
| Mineral lubricating oil, 300 SUS @ 100° F. | 84.0 | 81.8 |

[1] Prepared by reacting a mixture of equal mols of stearic acid, adipic acid and ethylene glycol as set forth below. Acid number is 164 (theoretical 123).
[2] Prepared by reacting a mixture of equal mols of stearic acid, ethylene glycol and azelaic acid.
[3] 5% excess alkali.

*Preparation*

*Grease A.*—A mixture of 1 mol of stearic acid, 1 mol adipic acid and 1 mol ethylene glycol was heated for two hours at a temperature of about 350° F. This acidic reaction product was dissolved in the lubricating oil by heating to a temperature of about 175° F. The lithium hydroxide was added to the resulting mixture; dehydration was then effected by heating to a temperature of about 300° F., and the grease mixture then cooled to room temperature.

*Grease B.*—Prepared similarly to Grease A except that azelaic acid was employed in place of the adipic acid as set forth below.

The final grease compositions had the following inspections:

|  | Grease A | Grease B |
|---|---|---|
| Dropping Point, ° F. | 500+ | 500+ |
| Worked Penetration, mm./10, 77° F. | 290 | 220 |
| Wheel Bearing Test (6 hrs., 220° F.): |  |  |
| Grams leakage | 4 |  |
| Slumping | Nil |  |
| Spindle Life, hrs. (10,000 r.p.m., 250° F.) | 600 |  |

EXAMPLE II

A number of greases were prepared from the following constituents:

*Formulation*

|  | Weight Percent | |
|---|---|---|
|  | Grease C | Grease D |
| Acidic Reaction Product | [1] 10 | [2] 16.4 |
| Lithium Hydroxide | 1.5 | 2.3 |
| Mineral Lubricating Oil, 300 SUS @ 100° F. | 88.5 | 81.3 |

[1] Prepared by reacting a mixture of equal mols of stearic acid, sebacic acid and ethylene glycol as set forth below. Acid number is 159 (theoretical 110).
[2] Prepared by reacting a mixture of equal mols of stearic acid, isosebacic acid and ethylene glycol as set forth below.

*Preparation*

*Grease C.*—A mixture of 1 mol stearic acid, 1 mol of sebacic acid and 1 mol of ethylene glycol was heated for one hour at a temperature of about 350° F. to obtain an acidic reaction product. This acidic reaction product was dissolved in the lubricating oil, and the grease was prepared in a manner similar to that described in Example I.

*Grease D.*—Prepared similarly to Grease C except that isosebacic acid was employed in place of sebacic acid.

The final grease compositions had the following inspections:

|  | Grease C | Grease D |
|---|---|---|
| Dropping Point, ° F | 530 | 500+ |
| Penetration, mm./10 @ 77° F.: | | |
| 60 strokes | 247 | 179 |
| 10,000 strokes | 263 (104° F.) | |
| Water Absorption @ 150° F | Absorbs 30%—sheds additional water—consistency good. | |

The above data show that effective lubricating grease compositions can be prepared by utilizing as the grease-thickening agents the metal salts of acidic reaction products obtained by reacting together dicarboxylic acids, high molecular weight monocarboxylic acids and glycols. The data further show that the readily available and inexpensive dicarboxylic acids can be employed in conjunction with certain other particular compounds to form acidic reaction products capable of being utilized as grease-thickening materials.

It will be further understood that the invention is not necessarily limited to the specific materials and operating conditions of the foregoing examples. These materials and conditions may be varied within the limits indicated in the general portions of the specification.

What is claimed is:

1. A lubricating oil composition thickened to a grease consistency with metal salt of the acidic reaction product of about equi-molar proportions of a $C_3$–$C_{10}$ saturated hydrocarbon dicarboxylic acid, a $C_{12}$–$C_{30}$ fatty acid, and a $C_1$–$C_{12}$ glycol and wherein said metal is selected from the group consisting of alkaline earth metals and alkali metals.

2. A composition according to claim 1, wherein said acidic reaction product is formed by heating a mixture of its components at a temperature of about 275° to 400° F. for about 1 to 5 hours.

3. The lubricating grease composition of claim 1 wherein said lubricating oil is a mineral lubricating oil.

4. A lubricating grease composition comprising lubricating oil thickened with a metal salt formed by the reaction of about equi-molar amounts of a $C_3$–$C_{10}$ saturated hydrocarbon dicarboxylic acid, a $C_{12}$–$C_{30}$ fatty acid, and a $C_1$–$C_{12}$ glycol with a metal base, said salt being formed by first reacting a mixture of said dicarboxylic acid, said fatty acid, and said glycol to form an acidic reaction product, and then saponifying said acidic reaction product in said lubricating oil with said metal base, wherein said metal is selected from the group consisting of alkali metal and alkaline earth metals.

5. A lubricating grease comprising lubricating oil thickened with a grease thickening amount of the lithium salt of the acidic reaction product of equi-molar proportions of a $C_3$ to $C_{10}$ saturated hydrocarbon dicarboxylic acid, a $C_{12}$ to $C_{30}$ fatty acid, and a $C_2$ to $C_6$ glycol.

6. A lubricant according to claim 5, wherein said dicarboxylic acid is adipic acid, said fatty acid is stearic acid, and said glycol is ethylene glycol.

7. A method of preparing a lubricating grease composition which comprises dispersing in a lubricating oil about 1 molar proportion of a dicarboxylic acid having the formula

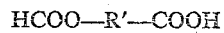

wherein R' is a saturated hydrocarbon radical containing about 1 to 8 carbon atoms, about 1 molar proportion of a high molecular weight monocarboxylic acid having about 12 to 30 carbon atoms per molecule, and about 1 molar proportion of a glycol having the formula

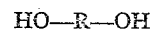

wherein R is an aliphatic hydrocarbon radical containing about 1 to 12 carbon atoms, heating the resulting mixture to a temperature within the range of about 200° to 320° F., cooling the heated mixture, adding a metal base saponifying agent to said cooled mixture, heating the resulting mixture to a temperature within the range of about 250° to 400° F. and then cooling to obtain said lubricating grease composition.

References Cited in the file of this patent

UNITED STATES PATENTS

| 2,191,738 | Balle | Feb. 27, 1940 |
| 2,294,259 | Van Peski et al. | Aug. 25, 1942 |
| 2,347,494 | Meigs | Apr. 25, 1944 |
| 2,487,080 | Swenson | Nov. 8, 1949 |
| 2,583,607 | Sirianni et al. | Jan. 29, 1952 |
| 2,699,428 | Lux et al. | Jan. 11, 1955 |
| 2,723,286 | Young et al. | Nov. 8, 1955 |
| 2,752,312 | Dixon | June 26, 1956 |
| 2,756,213 | Dixon | July 24, 1956 |
| 2,782,166 | Kolfenback et al. | Feb. 19, 1957 |
| 2,828,265 | Van Strien | Mar. 25, 1958 |
| 2,849,401 | Hotten | Aug. 26, 1958 |